April 1, 1947.　　　H. F. GORSUCH　　　2,418,299
POWER SHOVEL
Filed Nov. 18, 1944　　　3 Sheets-Sheet 1
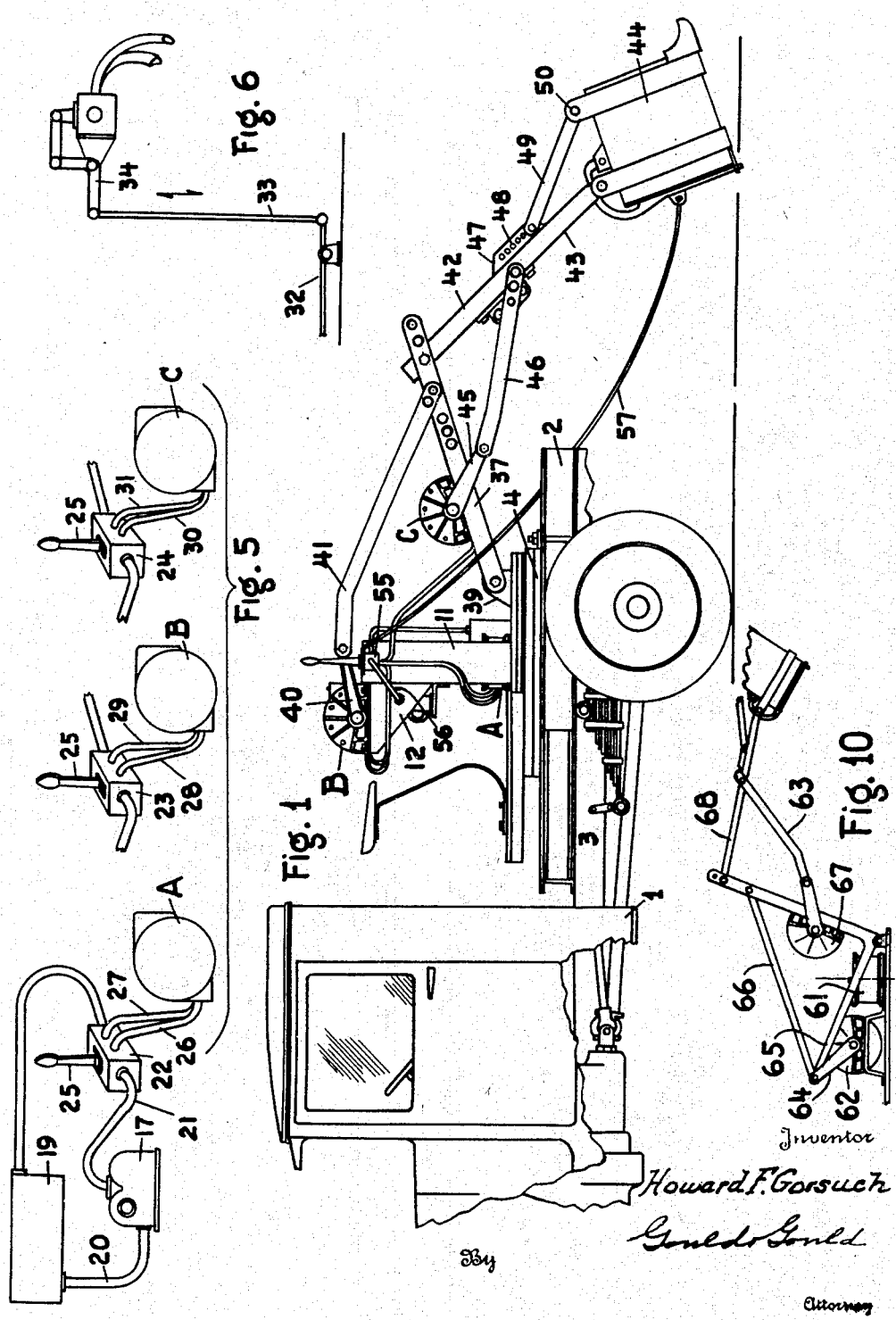
Inventor
Howard F. Gorsuch
By Gould & Gould
Attorney April 1, 1947.                H. F. GORSUCH                2,418,299
                              POWER SHOVEL
                  Filed Nov. 18, 1944           3 Sheets-Sheet 2
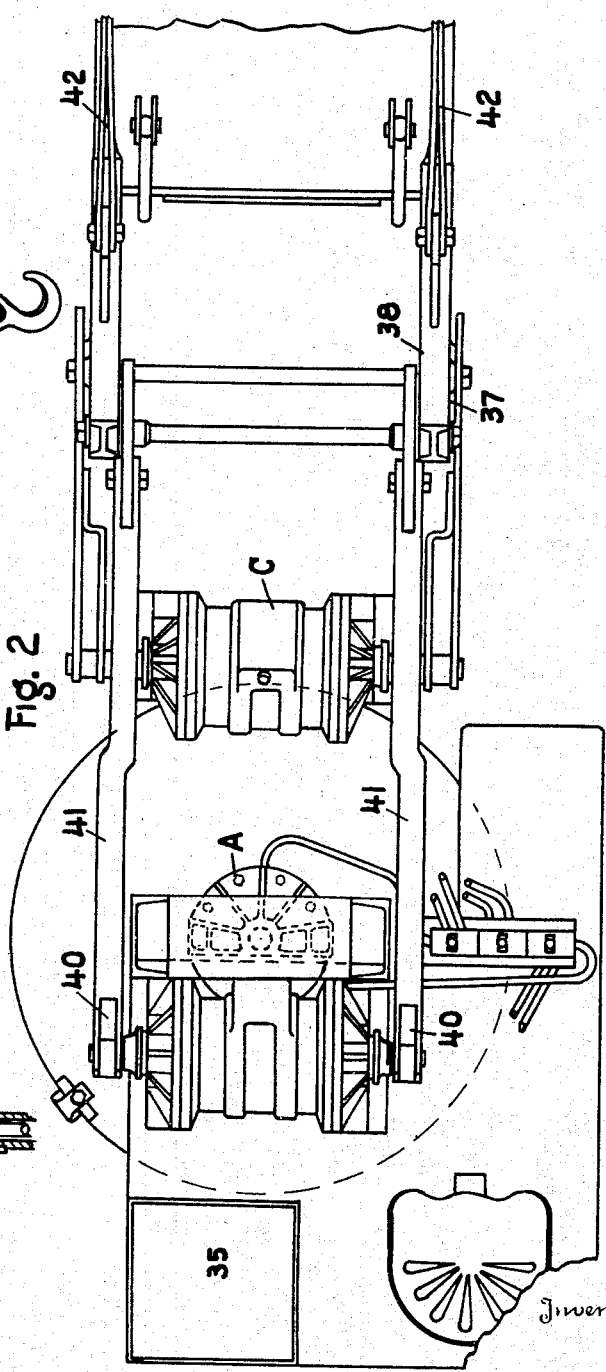
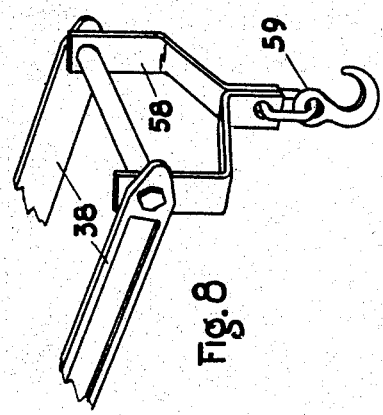
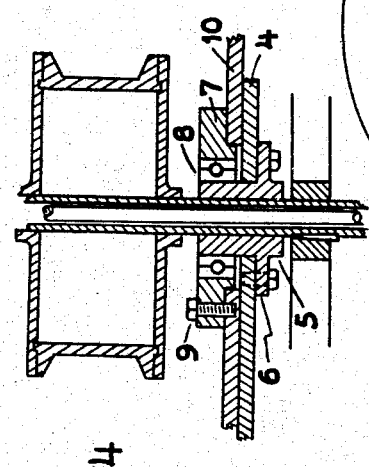
Inventor
Howard F. Gorsuch
By Gould Gould
Attorney

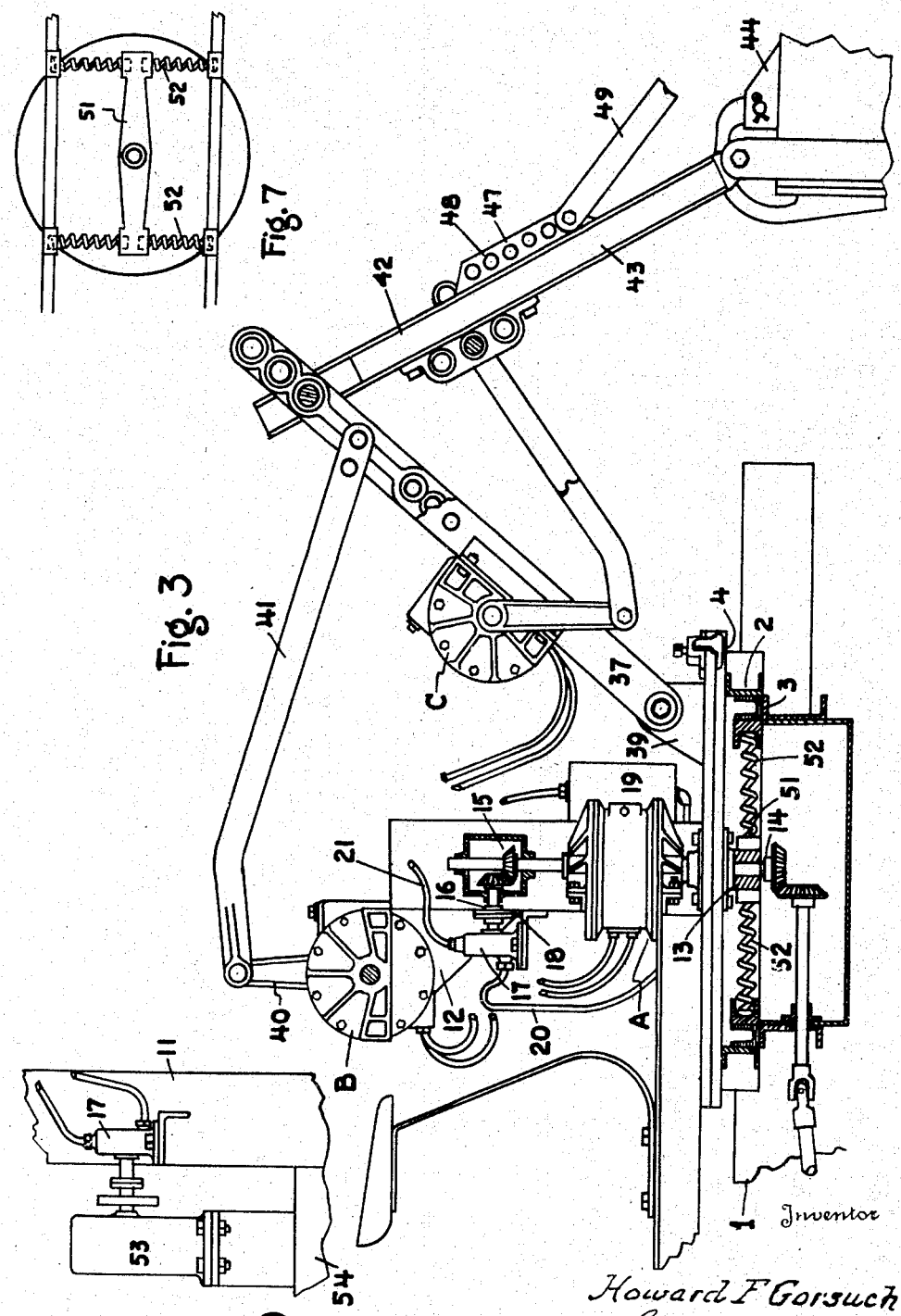

Patented Apr. 1, 1947

2,418,299

UNITED STATES PATENT OFFICE 2,418,299

POWER SHOVEL

Howard F. Gorsuch, Mansfield, Ohio

Application November 18, 1944, Serial No. 564,122

11 Claims. (Cl. 214—138)

This invention is directed to an improvement in power shovels and the like, wherein all the functions and advantages of the conventional power shovel are maintained while dispensing entirely with the use of cables, pulleys, or rack and pinion driving or connecting means.

In the universally accepted type of power shovels, the main boom is adjusted to the desired digging or operating position through the use of cables and pulleys, the shovel or other instrument adjusted to operating position through rack and pinion movement, and the digging and lifting of the shovel proper secured through the use of pulleys and cables.

These operating elements are continually subjected to severe strains and incident to such require almost continuous adjustment and frequent repair and renewal. Furthermore, the cable controls are particularly objectionable, requiring the use of cable drums and the operating space required for their mounting together with the mechanism for actuating and directly controlling the drums.

One of the primary objects of the present invention is the provision of a motor shovel in which the shovel beam and boom, as well as the operating elements of these parts, are in the form of metallic bars or frames pivotally connected, though relatively adjustable, forming a rigid lever action for operating the boom and the shovel beam, while entirely dispensing with the use of cables, cable drums, or gears and racks.

Again, in conventional power shovels, largely incident to their particular construction and arrangement of parts, there is absolute necessity of counterbalancing the digging strain, weight of the boom, and weight of the load. This generally necessitates the use of a power plant having sufficient weight and grip on the road surface to insure effective operation of the shovel. For this reason power shovels are ordinarily of caterpiller propulsion type, which materially restricts the utility of the power shovel owing to the length of time required for transportation of the shovel from place to place or even to different positions in a single digging or other operation.

A further object of the invention, therefore, is the provision of a power shovel in which the operative parts are so connected and related as to avoid the necessity for material or effective independent counterbalancing to a large extent, and thus permit the improved power shovel to be mounted and used in connection with a fast moving road vehicle, for example an ordinary automobile truck. The improved power shovel, may, with this advantage, be quickly and readily transported from job to job, and easily moved to different shovel operating positions as necessary in the particular job, to thus materially increase and enlarge the effective utility of the power shovel as a whole.

Conventionally power shovels are ordinarily operated by a single power unit, usually a steam engine, to secure desired flexibility. This necessitates a considerable number of control connections and governing members in order to utilize the power of the power unit to position the boom, position the shovel beam and lift the beam for the digging operation, as well as swinging the shovel as a unit for the discharge of the load. The absolute requirement for the numerous control elements by which the power may be directed along the desired line obviously necessitates the provision of a number of parts which require to be kept in repair, proper adjustment, and fully operative, which requirements entails considerable loss of time and labor, as is well understood by every shovel operator.

A further object of the invention is the provision of hydraulic motors, each having its independent function, and each directly carrying out that function. Thus such a motor is provided for controlling the boom, a second such motor provided for the control of the shovel beam, and a third such motor provided for turning the table on which the shovel parts as a whole are mounted. Independent controls are provided for these motors and owing to the complete independence of the motors and of the controls, any and all desired operations of the motors, singly or collectively may be carried out at will.

The invention, in the preferred form of construction and arrangement of parts, is illustrated in the accompanying drawings, in which:

Fig. 1 is a view in elevation, partly broken away, showing the improved power shovel.

Fig. 2 is a plan of the power shovel parts and controls.

Fig. 3 is an enlarged side elevation of the power shovel parts being in section.

Fig. 4 is a vertical sectional view showing the turntable mounting and support and the motor for operating the same.

Fig. 5 is a view showing in independent perspective the various controls for the operating motors.

Fig. 6 is a view in elevation showing a foot control for the turntable motor.

Fig. 7 is a bottom plan of the shock-absorbing means.

Fig. 8 is a broken perspective showing the use of a hook for converting the construction to a power hoist.

Fig. 9 in a view in broken elevation showing a modified power means for operating the pump.

Fig. 10 is a diagrammatic view of a slight modification of the operating arrangement.

The invention is here shown and will be described as mounted on a more or less conventional motor truck 1, to provide convenient and rapid portability of the power shovel when desired. However, no limitation is to be understood by this showing and description, as the shovel may be mounted on a mobile base or even on a fixture, according to the requirements of the particular mechanism, and any and all such bases are to be considered as contemplated within the spirit of the invention.

The mechanism of the improved power shovel is supported on channel beams 2, secured to and extending transversely of the chassis frame bars 3 of the vehicle. A base plate 4 is rigidly supported on the beams 2. A sleeve member 5 is rigidly bolted at 6 to plate 4, and rises above the plate to receive the elements 7 and 8 of an antifriction bearing, the movable element of which is secured at 9 to a turntable 10, which is thus freely rotatable relative to plate 4. This detail of construction is more clearly shown in Fig. 4.

Extending upwardly from the turntable, and in relatively spaced relation are brackets 11, of sufficient height and strength to support operating parts of the mechanism. A motor, preferably hydraulic, is mounted between the brackets 11, which motor, herein indicated at A, will be hereinafter referred to as the turntable operating motor. This motor A is connected directly to the turntable 10. A second motor B is supported by brackets 11 and 12, this motor B serving to control the boom of the shovel as hereinafter referred to. A third motor C is mounted directly on the shovel beam, hereinafter noted, for operating such beam.

These motors A, B, and C, are served from a common source of power, and independently controlled, as necessary. The shaft 13 of motor A is hollow and extends through the turntable bearing base plate 4, and to and through a shock-absorber to be described. A power shaft 14 extends upwardly through the motor shaft 13, the lower end of shaft 14 being geared to a power shaft or take-off of the engine or transmission of the vehicle 1, which upper end is geared at 15 to the shaft 16 of a fluid pump 17, mounted on brackets 18 secured to one or both of the brackets. A fluid reservoir 19 will be located in any convenient position and is connected by a pipe 20 to and serving as the inlet for the pump 17. The outlet pipe 21 from the pump leads through control valves as 22, 23, and 24, each designed for manual control by a lever 25, and operatively controlling the operation of the respective motors. That is, valve 22 is connected by pipes 26 and 27 to provide a pressure flow to and from motor A, valve 23, serving through pipes 28 and 29 the motor B, while valve 24, through pipes 30 and 31 operating motor C.

As previously stated the motor A directly operates the turntable, and if desired, and as preferred, the valve 22, or more particularly the operating lever 25 therefor, may be controlled from a remote position by a foot lever 32, connected by a rod 33, which through the medium of an angle lever 34 operates the lever of valve 22.

The boom 37 is of skeleton form, including spaced beams 38 of sufficient structural strength, connected by cross bars to provide a uniform rigid structure. The beams 38 are pivotally mounted on standards 39 rising from the turntable 10, and are connected for operation by the motor B, through the medium of arms 40 rigidly connected at their respective ends of the shaft of motor B, and bars 41 connected to the arms and adjustably connected to the beams 38 of the boom.

A dipper stick 42, also of skeleton form and including spaced parallel side bars 43, braced by cross beams is adjustably connected at one end to the beams of the boom, near the free ends of the latter. The opposite ends of the dipper stick bars 43 are connected to the shovel 44, preferably near the bottom of the latter. The dipper stick is operated by motor C, the shaft of which carries rigid arms 45, connected adjustably by bars 46 to the respective bars 43 of the dipper stick. The digging stroke of the shovel and the elevation of the loaded shovel can thus be controlled to an appreciable degree by control of the motor C through operation of its governing valve. A plate 47, provided with holes 48 provides for the selective adjustment of bars 49, connected at 50 to the forward end of the shovel, to thus provide a desired angle of digging operation of the shovel.

As a means for providing against damage under undue strains or stresses, the construction contemplates a compensating device shown more particularly in Figs. 3 and 7. Here an arm 51, connected to the axis of the turntable 10, is connected at its ends to the centers of resilient members 52 fixed to the channel beams 2. This device will resist sudden and extreme movements of the parts under shovel action and provide automatic compensation for undesirable strains and stresses.

It is of course to be understood that the motors A, B, and C, are through appropriate operation of conventional valves 22, 23, and 24, capable of being operated in either direction, to thus secure movement in opposite directions of the turntable, boom, and dipper stick. While the unit for mounting the power shovel is preferably a wheeled power truck, for its many obvious advantages of rapid transportation and shifting, such unit may be a platform for rigid placement, or any other desired type of base best suited to the particular work in hand.

Again, as shown in Fig. 9 when found necessary or expedient the pump 17 may be directly driven by an independent power unit, as an engine or motor 53, supported on an appropriate base 54 rising from or supported by the turntable 10. 57 is a trip rope or cable for manual release of latch on bottom of shovel. The shovel bottom, latched in place while loading, is released for dumping through manual control of a valve 55, controlling a fluid supply from the pump 17, and governing a latch release of any conventional type through pipes 56 and 57, shown more particularly in Fig. 1.

The construction designed is described particularly as a power shovel, but obviously can as readily serve as a hoist or like purpose. For example, as shown in Fig. 8, the shovel 44 is removed and the boom beams 38 connected to a swinging frame 58, from which depends a freely-supported hook 59, which obviously may be supplanted by any desired or suitable implement capable of giving any desired function in the use of the apparatus that may be needed in a particular need.

The hydraulic system preferred for use in the present apparatus is a circulating system, wherein the only time pressure is used is while the motors are working and then such pressure is only in the one line in use—from pump to valve to motor. While the motors are at rest regardless of position there is no pressure in the lines from valves to pump, and thus fluid churning or heating cannot occur.

Fig. 10 illustrates a slight modification, wherein the turntable, here indicated at 60, is mounted to be operated by the motor 61, as in the form previously described. The motor 62 for operating the boom, here indicated at 63 is in this modification appropriately supported directly on and moves with the turntable. The shaft of motor 62 is provided with an arm 64, connected through a compensating connection, as a slotted formation (not shown) to a lever 65, rigidly connected at one end to the boom at or adjacent its mounting on the turntable. The opposite end of the bar 65 is connected by a brace 66 to the boom remote from its mounting. The motor 67 shown for operating the shovel beam 68 in the modification is in accordance with the showing and operation of motor C in the first form described.

The lever system shown in the modification is of particular value in adapting the improvement as a ditch digger, in which case the boom 63 is preferably a single member. The modified form may obviously be used as a shovel—using a double or single form boom—and has the advantage of further lowering the specific gravity, as compared with the first form, to insure better operating function under severe conditions.

The operation of the apparatus of both forms is readily apparent from the above description. Through the simple control of the appropriate valve, the turntable may be turned to and from any position, the boom and dipper stick lowered for similarly positioning the shovel and then raised to any desired height for discharge of the shovel load through control of valve 55.

Having thus described the invention what is claimed as new is:

1. A power shovel and hoist including a turntable, a boom pivotally supported and movable with the turntable, a dipper stick pivotally connected to the boom, a power unit for supplying power in both directions, brackets for supporting the power unit with its axis at right angles to the axis of the turntable, said power unit including a power shaft, a connection between the power shaft and the boom, a second power unit for supplying power in both directions, said second power unit having a power shaft connected to the dipper stick, the connections between the power units and the boom and dipper stick being adjustable.

2. A power shovel and hoist including a turntable, a boom pivotally supported by and movable with the turntable, a power unit for supplying power in both directions, said power unit being mounted to selectively operate the turntable in either direction, a dipper stick pivotally connected to the boom, a power unit supported by the turntable with its axis at right angles to the axis of the turntable, said power unit including a power shaft directly connected to the boom, an additional power unit for supplying power in both directions, said additional power unit being carried by the boom and directly connected to the dipper stick, and means for selectively controlling the operations of the respective power units.

3. A construction as defined in claim 2, wherein the means for selectively controlling the power units includes a single pump for delivering a fluid under pressure, and a valve for controlling the pump flow to each of the power units at will.

4. In combination with a motor truck, including an engine, a turntable mounted on the truck, a boom connected to and movable with and relative to the turntable, a dipper stick connected to and movable with and relative to the boom, a shovel carried by the dipper stick, a member connected to the shovel and adjustably connected to the dipper stick for adjusting the operating angle of the shovel, a plurality of hydraulic motors for particular and independent operation of the turntable, boom, and dipper stick, a valve for each motor for governing the direction and operation of such motor, and a single fluid pressure element for delivering fluid pressure within the control of each valve.

5. A construction as defined in claim 4, wherein the shaft for the motor for the turntable is axially aligned with the axis of the turntable and wherein the motor for the boom is offset from the axis of the turntable in opposition to the projection of the boom relative to the turntable for counter-balancing the load carried by the boom.

6. A construction as defined in claim 4, wherein the axis of the boom connected motor is supported above the motor for the turntable, offset from the turntable motor with its operative axis at right angles to that of the turntable motor, and wherein an arm is connected to and moved by the boom-connected motor and adjustably connected to the boom.

7. In combination with a motor truck, a power shovel including a turntable, a motor carried by and for operating said turntable, and a shock absorber arranged below the turntable and connected to the frame of the motor truck, said shock absorber being directly connected to and operated by the shaft of the motor.

8. A construction as defined in claim 4, wherein the shovel is pivotally supported at its lower end on the dipper stick, and wherein the upper end of the shovel is adjustable connected to the dipper stick for changing the operative angle of the shovel at will.

9. A power shovel including a base, a turntable mounted thereon, a motor mounted axially on the turn table for operating the same, a boom connected to the turntable near the edge thereof, a second motor supported by and above the turntable, said second motor counterbalancing the boom and connecting directly to the boom for operating such boom, a dipper stick carried by the boom, a shovel carried by the dipper stick, a pump carried by the turntable and directing motive fluid under pressure to each of said motors, and independent manually-controlled valves for governing the motive fluid from the pump to the respective motors, said pump serving both valves.

10. A construction as defined in claim 9, wherein the pump is operated directly by the turntable-carried and operating motor.

11. A construction as defined in claim 9, wherein the second motor and pump are mounted above and in line with the turntable in substantially diametric opposition to the mounting of the boom on such turntable, whereby the weight of the second motor and pump act as a counterweight to the boom in operation.

HOWARD F. GORSUCH.

REFERENCES CITED

The following references are of record in the file of this patent:

UNITED STATES PATENTS

| Number | Name | Date |
|---|---|---|
| 2,109,388 | Heller | Feb. 22, 1938 |
| 590,990 | Kilgore | Oct. 5, 1897 |
| 2,338,361 | Shinn | Jan. 4, 1944 |
| 1,313,217 | Jackson | Aug. 12, 1919 |
| 2,365,168 | Billings | Dec. 19, 1944 |
| 2,286,537 | Gorsuch | June 16, 1942 |
| 2,162,994 | Baker | June 20, 1939 |
| 1,480,623 | Liebmann | Jan. 15, 1924 |
| 876,517 | Benedick | Jan. 14, 1908 |
| 1,444,670 | Dovel | Feb. 6, 1923 |
| 1,328,487 | Billings | Jan. 20, 1920 |
| 2,139,255 | Bixby | Dec. 6, 1938 |
| 2,370,661 | Hayes | Mar. 6, 1945 |
| 1,169,569 | Roberts | Jan. 25, 1916 |
| 1,783,787 | Hansen | Dec. 2, 1930 |
| 671,925 | Snyder | Apr. 9, 1901 |

FOREIGN PATENTS

| Number | Country | Date |
|---|---|---|
| 655 | British | Feb. 10, 1882 |